United States Patent
Romer

(10) Patent No.: US 6,268,000 B1
(45) Date of Patent: Jul. 31, 2001

(54) PASTRY DOUGH OR CAKE DECORATING DEVICE

(76) Inventor: Arthur H. Romer, 1118 Orchard Way, Silver Spring, MD (US) 20904

( * ) Notice: Subject to any disclaimer, the term of this patent is extended or adjusted under 35 U.S.C. 154(b) by 0 days.

(21) Appl. No.: 09/537,403

(22) Filed: Mar. 29, 2000

(51) Int. Cl.[7] ................ A23P 1/00; B05C 5/00; B67B 7/00
(52) U.S. Cl. .............. 426/115; 118/24; 118/300; 222/1; 222/326; 222/327; 222/386; 222/387; 426/383
(58) Field of Search ............. 426/87, 115, 383, 426/572; 118/24, 300; 222/1, 326, 327, 386, 387, 389

(56) References Cited

U.S. PATENT DOCUMENTS

| | | |
|---|---|---|
| D. 310,317 | 9/1990 | Broderick et al. . |
| D. 335,069 | 4/1993 | Capellan . |
| 2,767,885 | 10/1956 | Miller . |
| 3,057,521 | 10/1962 | Ballard . |
| 3,208,643 | 9/1965 | Phillips . |
| 3,339,524 | 9/1967 | Benz . |
| 3,866,838 | 2/1975 | Miles . |
| 3,921,858 | 11/1975 | Bemm . |
| 4,838,457 | 6/1989 | Swahl et al. . |
| 4,844,917 | 7/1989 | DeLorimiere . |
| 4,852,772 | * 8/1989 | Ennis, III .............. 222/327 |
| 4,961,517 | 10/1990 | Tkac . |
| 5,005,514 | 4/1991 | Verrico . |
| 5,223,245 | 6/1993 | Ibrahim et al. . |
| 5,370,734 | 12/1994 | Ferrero . |
| 5,505,775 | 4/1996 | Kitos . |
| 5,634,574 | 6/1997 | McArthur et al. . |
| 5,775,533 | * 7/1998 | Schroeder .............. 222/326 |
| 5,826,758 | 10/1998 | McArthur et al. . |

OTHER PUBLICATIONS

"Handi–Matic", www.unifiller.com/handy.html, (1999).

* cited by examiner

Primary Examiner—George C. Yeung
(74) Attorney, Agent, or Firm—Jeffrey S. Melcher; Manelli Denison & Selter, PLLC

(57) ABSTRACT

Provided is a novel device for dispensing pastry dough, frosting or icing from a cartridge. The device has a cartridge container and a hand-held gun. An electric motor having a piston is coupled to the cartridge container. The piston acts on a plunger of the cartridge to apply pressure on the pastry dough, frosting or icing to permit the pastry dough, frosting or icing move to the gun to be dispensed.

35 Claims, 7 Drawing Sheets

PASTRY DOUGH OR CAKE DECORATING DEVICE

FIELD OF THE INVENTION

The invention relates to a hand-held device for applying pastry dough, frosting or icing. The invention also relates to a method for applying pastry dough, frosting or icing.

BACKGROUND OF THE INVENTION

Decoration of cakes, pastries or the like foodstuffs with an attractive and tasty frosting or icing is a necessary and time consuming task. The preparation thereof frequently results in a significant mess, with spillage and clutter as a consequence of the required mixing containers, food coloring and flavoring bottles. This is especially true on a commercial level when it is desired to prepare frostings of varying colors for differing festive occasions as well as to provide frostings or trim icings of various flavors to complement the cake or pastry.

Frostings and icings having a high viscosity are usually applied using a baker's pastry bag, such as the ones disclosed in U.S. Pat. Nos. 4,961,517, 4,844,917, and Des. 310,317, or with a pastry gun as shown in U.S. Pat. No. Des. 335,069. The pastry bag and the pastry gun require significant force to squeeze the bag or trigger to force high viscosity frosting or icing through shaped nozzles and onto a cake or pastry. When used on a commercial level where numerous cakes and pastries must be coated with frosting and icing, the user's hands may become fatigues thus requiring the user to take rest breaks. Resting due to fatigue can undesirably raise the cost of preparing the cakes and pastries. Furthermore, fatigue can result in unwanted missapplication of the frosting or icing. Thus, there is a need for a device which applies high viscosity frostings and icings that does not require significant human force during application in order to avoid undesirable fatigue.

Forming pastry dough into shapes is similar to forming icing or frosting. Pastry bags have been used to form pastry dough into desired shapes. However, as with icing and frosting, when used on a commercial level where numerous pastries must be formed, fatigue can occur which requires significant amounts of resting. Resting due to fatigue can undesirably raise the cost of preparing the pastries. Therefore, a device which is capable of forming pastries without significant human force is desired.

SUMMARY OF THE INVENTION

An objective of the present invention is to provide a device for applying high viscosity frosting or icing to a pastry dough or cake which does not require significant human force.

Another objective of the present invention is to provide a device for applying high viscosity pastry dough which does not require significant human force.

The above objective and other objectives can be obtained by a device for dispensing pastry dough, frosting or icing from a cartridge containing pastry dough, frosting or icing, the cartridge having a cartridge outlet and a plunger mounted for movement within the cartridge in a direction toward said cartridge outlet, the device comprising:

a cartridge container defining an internal chamber constructed and arranged to contain a cartridge therein, a hand-held gun having a gun valve and a finger trigger to actuate the gun valve, a nozzle connected to the gun and having a shaped opening, a hose constructed and arranged to connect the cartridge outlet to the gun, a reversible electric motor removably coupled to an end of the cartridge container, the motor comprising:

a piston, a shaft coupled to the piston to move the piston generally linearly in both forward and reverse directions, and a switch structure to control operation of the motor, whereby, when a cartridge containing pastry dough, frosting or icing is disposed in the cartridge container and the cartridge outlet is connected with the hose and when the motor is actuated, the shaft moves the piston and the piston engages the plunger thereby forcing pastry dough, frosting or icing to the gun, and actuation of the finger trigger permits the pastry dough, frosting or icing to be dispensed from the nozzle.

In accordance with another aspect of the invention, a method is provided for dispensing pastry dough, frosting or icing from a cartridge containing pastry dough, frosting or icing, the cartridge having a cartridge outlet and a plunger mounted for movement in a direction toward said cartridge outlet. The method includes:

inserting the cartridge into a cartridge container, coupling one end of a hose to a cartridge outlet, another end of the hose being connected with a hand-held gun having a gun valve, a finger trigger to actuate the gun valve, and a nozzle connected to the gun and having a shaped opening, coupling a reversible electric motor in a removable manner to an end of the cartridge container, the motor comprising a piston and a shaft coupled to the piston to move the piston generally linearly in both forward and reverse directions, the motor including switch structure to control operation of the motor, actuating the motor to move the shaft and thus move the piston forwardly to engage the plunger thereby forcing the pastry dough, frosting or icing into the hose, and actuating the finger trigger to permit the pastry dough, frosting or icing to be dispensed from the nozzle.

The present invention also provides a device for dispensing pastry dough, frosting or icing from a cylinder containing pastry dough, frosting or icing, the device comprising:

a frosting cylinder defining an internal chamber constructed and arranged to contain pastry dough, frosting or icing, the frosting cylinder having on an end a frosting outlet, a hand-held gun having a gun valve and a finger trigger to actuate the gun valve, a nozzle connected to the gun, the nozzle having a head defining a shaped opening, a hose constructed and arranged to connect the outlet to the gun, a reversible electric motor removably coupled to an end of the frosting cylinder, the motor comprising:

a piston, a shaft coupled to the piston to move the piston generally linearly in both forward and reverse directions, a switch structure to control operation of the motor, and a plunger coupled to the piston, the plunger being constructed and arranged to slidably seal against an inner surface of the frosting cylinder, whereby, when pastry dough, frosting or icing is disposed in the frosting cylinder and the outlet is connected with the hose and when the motor is actuated, the shaft moves the piston and the piston forces the plunger against the pastry dough, frosting or icing thereby forcing the pastry dough, frosting or icing to the gun, and actuation of the finger trigger permits the pastry dough, frosting or icing to be dispensed from the nozzle.

The present invention also provides a method of dispensing pastry dough, frosting or icing from a device, the method comprising:

inserting pastry dough, frosting or icing into a frosting cylinder having an outlet;

coupling one end of a hose to the outlet, another end of the hose being connected with a hand-held gun having a gun valve, a finger trigger to actuate the gun valve, and a nozzle connected to the gun, the nozzle including a head defining a shaped opening;

coupling a reversible electric motor in a removable manner to an end of the frosting cylinder, the motor comprising a piston and a shaft coupled to the piston to move the piston generally linearly in both forward and reverse directions, the motor including switch structure to control operation of the motor, the piston being coupled to a plunger which is constructed and arranged to slidably seal against an inner surface of the frosting cylinder;

actuating the motor to move the shaft and thus move the piston forwardly to engage the plunger against pastry dough, frosting or icing disposed in the frosting cylinder thereby forcing the pastry dough, frosting or icing into the hose; and actuating the finger trigger to permit the pastry dough, frosting or icing to be dispensed from the shaped head.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF PREFERRED EMBODIMENTS

Figure 1:
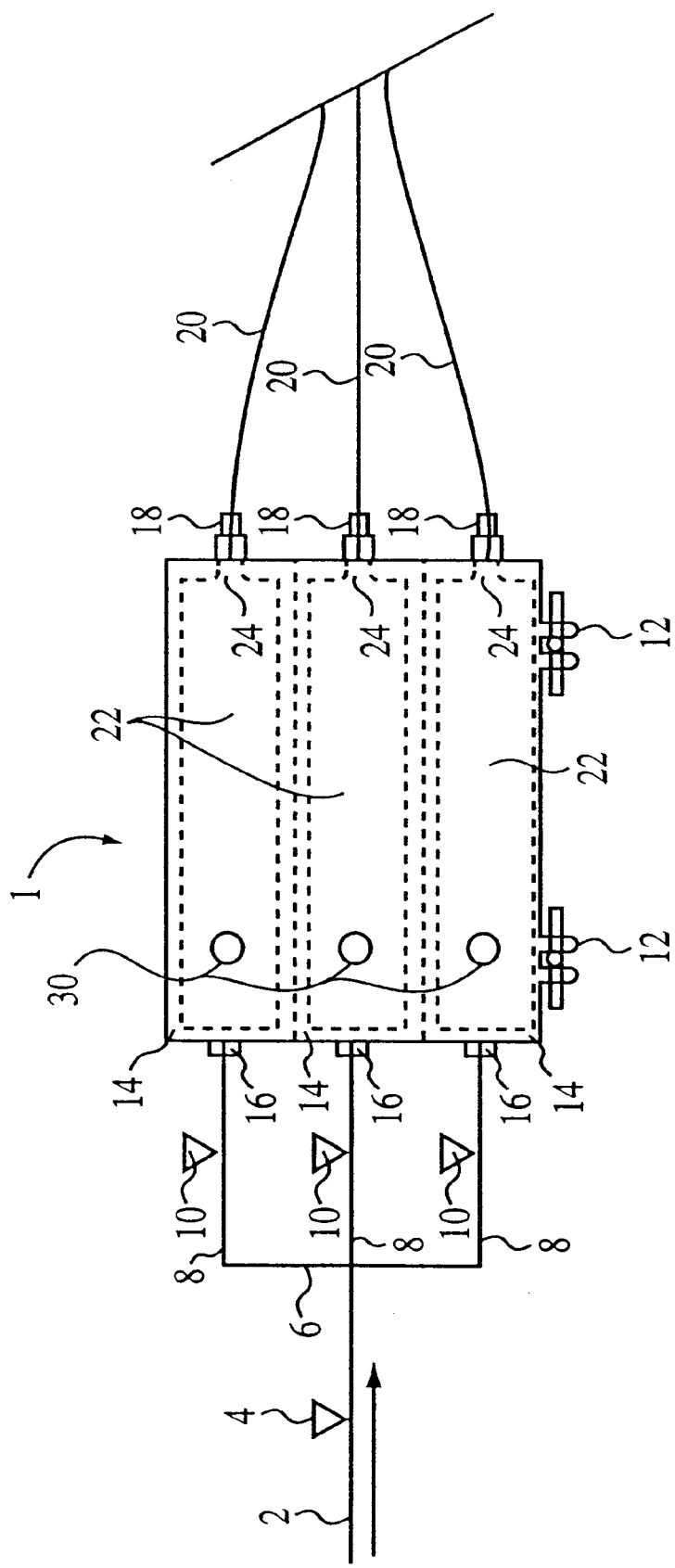
FIG. 1 illustrates a top view of the cartridge box according to the present invention.
Figure 2:
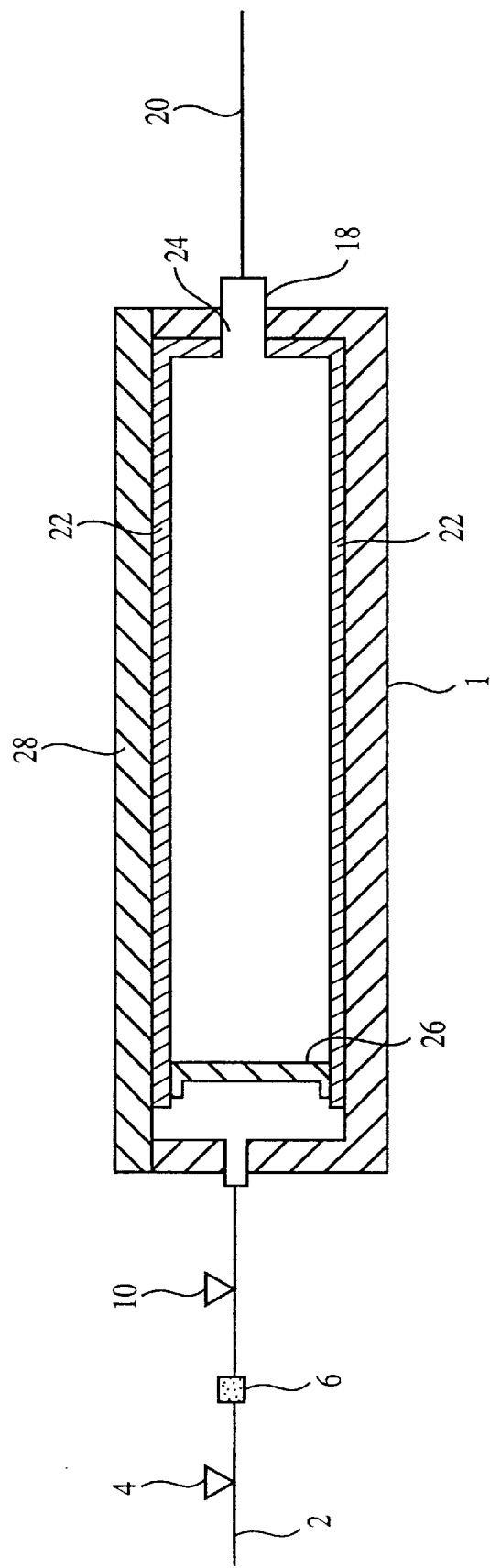
FIG. 2 illustrates a cross-sectional view of a side of the cartridge box according to the present invention.

The invention will now be described with reference to the attached Figures. FIGS. 1 and 2 illustrate a cartridge box 1 which houses three cartridges 22 that contain pastry dough, icing or frosting. A pressurized air hose 2 is connected to an air compressor (not shown). Any standard air compressor can be used. The air pressure in the air hose 2 is regulated using a conventional air pressure valve 4. A splitter 6 is used to divide the air pressure in the air hose 2 into three separate air conduits 8.

The cartridge box 1 is a walled structure defining three internal chambers shown at 14. Each internal chamber 14 has an associated air inlet 16, for supplying air under pressure to the internal chamber 14. Each air inlet 16 is connected to a separate air conduit 8. Each air conduit 8 has an associated standard air pressure valve 10 for controlling the air pressure supplied to each internal chamber 14 independently of the other internal chambers 14. The number of internal chambers 14 can be varied as desired. For example, the cartridge box can contain one internal chamber 14, or a plurality of internal chambers 14. Preferably, each internal chamber 14 has an associated air conduit 8 and air pressure valve 10 to adjust the air pressure within the internal chamber 14.

Each internal chamber 14 has an associated outlet 18 through which the pastry dough, icing or frosting passes. Each outlet 18 is connected to a hose 20. The internal chambers 14 are constructed and sized to contain a cartridge 22 containing, pastry dough, frosting or icing. The cartridge box 1 can be opened using the lid 28. The lid 28 can be secured using any suitable securing device, such as a hinge on one side and a locks 12 as shown in FIG. 1, or the lid 28 can slide into a grove on the body of the cartridge box 1 (not shown). If desired, screws, bolts, clamps, cam locks, and the like can be used to secure the lid 28 to the body of the cartridge box 1. While a top lid 28 has been described, the location of the lid 28 on the cartridge box 1 can be provided in any desired location, such as on a side of the cartridge box 1 and the air inlets 16 provided on the lid 28 (embodiment not shown).

FIG. 2 illustrates a cross-sectional view through the center of a cartridge 22. The cartridge 22 comprises a tubular walled structure having openings on opposite ends and a substantially constant inner diameter. On one end of the cartridge 22, a cartridge outlet 24 is provided. An inside surface defining the internal chamber 14 and the inside surface of the lid 28 are constructed such that a seal is provided around the outer surface of the cartridge 22 when the lid 28 is secured in place and/or when air pressure is applied to the internal chamber 14. This prevents air from traveling around the cartridge 22 inside of the internal chamber 14 and through the outlet 18, instead of applying pressure to the plunger 26. This seal to the outside surface of the cartridge 18 can be provided by shaping the inside surface of the lid 28 and the surface defining the internal chamber 14 to mate with the outside surface of the cartridge 22 and provide a seal upon contact to the outside surface of the cartridge 22. If desired, other means of sealing using the outside surface of the cartridge 22 can be utilized, such as gaskets. Alternatively, or in addition to sealing the outside of the cartridge 22 to the internal chamber 14 and lid 28, the cartridge outlet 24 and the outlet 18 can be constructed to provide a seal when the cartridge 22 is loaded into the internal chamber 14, to prevent air from traveling around the cartridge 22 inside of the internal chamber 14 and through the outlet 18, instead of applying pressure to the plunger 26. This can be accomplished, for example, by the use of materials which provide a seal without the use of gaskets or by using an o-ring, flat gasket or other suitable seal material. At the other end the cartridge 22, an opening is provided for accepting pastry dough, icing or frosting. Once the cartridge 22 is filled with the desired material, a plunger 26 is inserted into the cartridge 22. The cartridge 22 operates much like a calking tube. Once air pressure is applied to the plunger 26, the plunger 26 is forced further into the cartridge 22, which forces pastry dough, icing or frosting out of the cartridge 22.

The desired icing or frosting can be purchased prepackaged in cartridges 22. Alternatively, the desired pastry dough, icing or frosting can be formulated and then inserted in a cartridge 22, followed by inserting the plunder 26. In addition, the device can also be used to form pastry dough. The desired pastry dough can be purchased prepackaged in cartridges 22. Alternatively, the desired pastry dough can be formulated and then inserted in a cartridge 22, followed by inserting the plunder 26.

Figure 3:
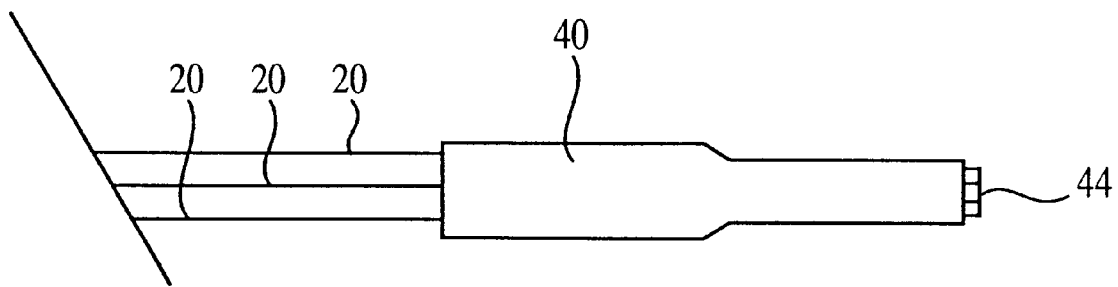
FIG. 3 illustrates a top view of the hand-held gun according to the present invention.
Figure 4:
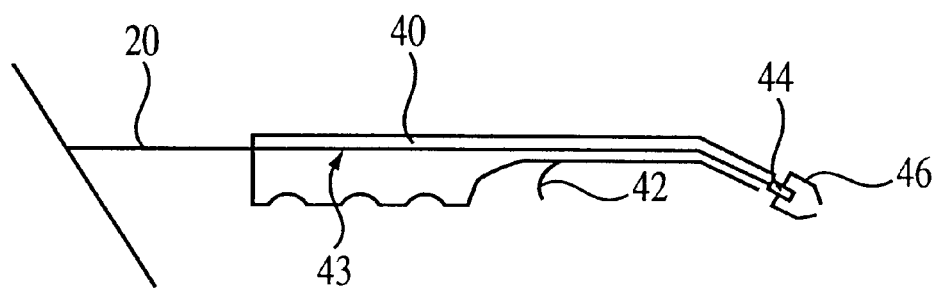
FIG. 4 illustrates a side view of the hand-held gun according to the present invention.

FIGS. 3 and 4 illustrate top and cross-sectional views of a hand-held gun 40 for controlling dispensing of the pastry dough, icing or frosting from the device. The hand-held gun 40 is connected to the three hoses 20 and each hose is connected to an associated gun valve 43 that is activated by the finger trigger 42. The finger trigger 42 opens the gun valves 43 and allows pastry dough, icing or frosting to flow therethrough. Preferably, the gun valves 43 are constructed such that the greater the amount the finger trigger 42 is pulled, the more the gun valves 43 open allowing more pastry dough, frosting or icing to flow therethrough. The gun valves 43 are each connected to an associated nozzle 44. The nozzles 44 are connected to an interchangeable head 46, through which the pastry dough, icing or frosting flows. The interchangeable head 46 can have a shaped opening to provide the desired shape of pastry dough, icing or frosting. The interchangeable head 46 works in the same manner as shaped heads on conventional pastry bags. Thus, one skilled in the art will easily be able to provide a shaped head 46 for the desire shape of pastry dough, icing or frosting.

The operation of the device will now be described. First, air pressure is relieved in the internal chambers 14 by closing the valves 10 and opening the valves present in the hand-held gun 40. Once the air pressure in the internal chambers 14 is relieved, the lid 28 is opened to provide access to the internal chambers 14. The desired cartridge(s) 22 is inserted in the internal chamber(s) 14 and the lid 28 is closed. Pressure is then applied to the internal chamber(s) 14 by opening the valve(s) 10. In general, the greater the air pressure against the plunger 26, the greater the speed at which the pastry dough, icing or frosting will travel out of the cartridge 22, through the hose 20, and out of the hand-held gun 40 when the trigger 42 is pulled. Therefore, by varying the amount of air pressure against the plunger 26 using the valve 10, the speed of the pastry dough, icing or frosting being applied can be varied. When a variable gun valve(s) 43 is utilized in the hand-held gun 40, the flow speed of the pastry dough, icing or frosting can also be adjusted by varying the amount the gun valve 43 is open or closed using the trigger 42. Furthermore, when multiple cartridges 22 are used, the pressure can be shut off and turned-on to each cartridge 22 independently to easily change between different types or combinations of pastry dough, icing or frosting being applied using the hand-held gun 40. For example, more than one type of frosting or icing can be applied simultaneously using the device by applying the desired amount of air pressure to more than one internal chamber 14. The air pressure can also be adjusted among the different cartridges 22 to compensate for differences in viscosity. Higher viscosity materials usually require a higher pressure to provide a desired level of speed through the hand-held gun 40. The device is suitable for applying high viscosity materials such as pastry dough, frosting and icing, which have a putty-like consistency and do not flow fast or cannot be sprayed like a liquid. Liquid materials, such as glazes and inks are generally unsuitable for use in the device described herein. Furthermore, such liquid materials require a spraying device which is very different from the device described herein.

To provide easy cleaning of the device, each internal chamber 14 can optionally be provided with an associated water inlet 30 for supplying water to the internal chamber 14. Each water inlet 30 should be provided with a back-flow valve or other shut-off valve to prevent air pressure from escaping the internal chamber 14. Each internal chamber 14 can be cleaned by supplying water to the internal chamber 14 through the inlet 30 and then opening the valve 10 and gun valve 43 to allow air to flow through the internal chamber 14 which will flush the water through the hose 20 and hand-held gun 40.

Figure 5:
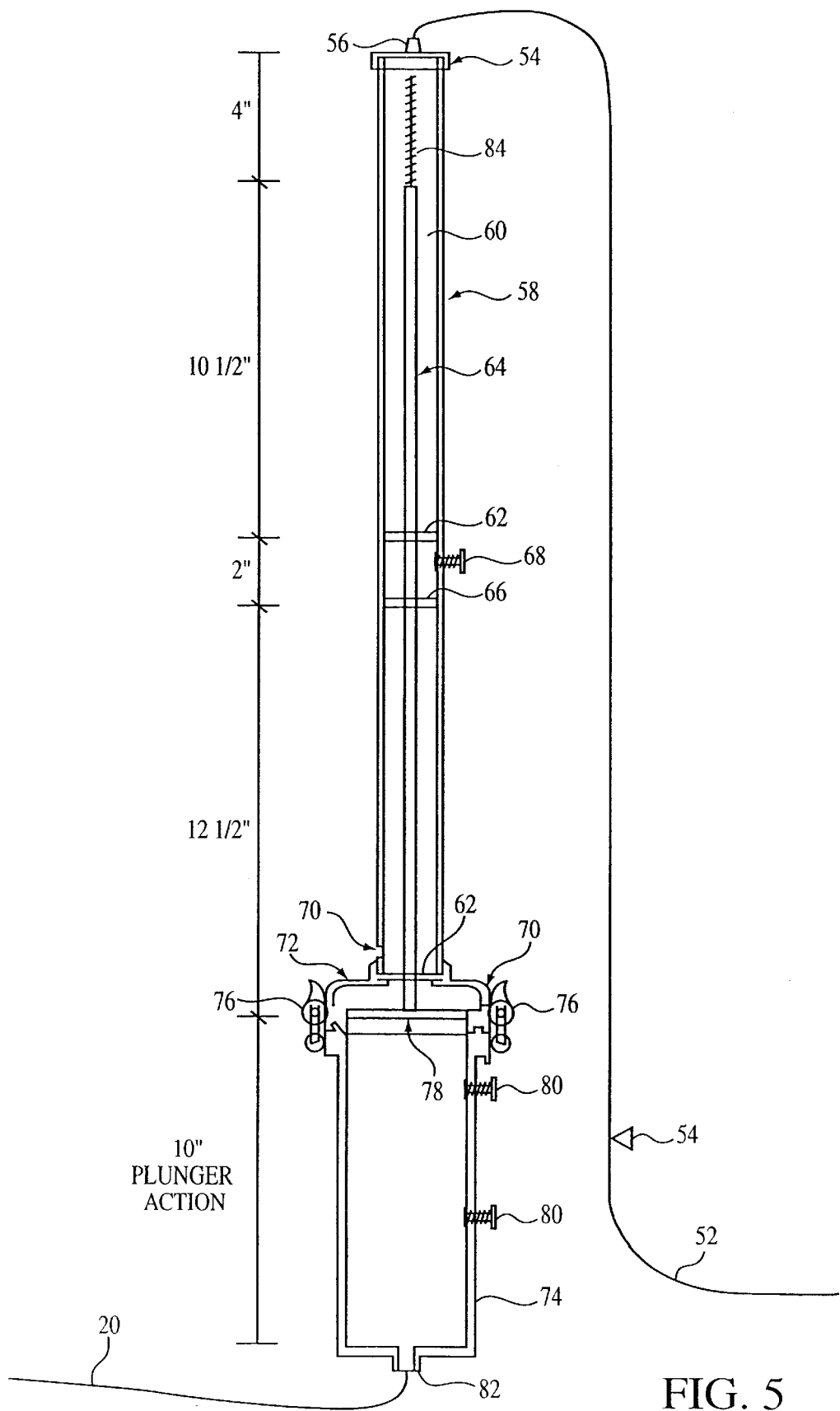
FIG. 5 illustrates an alternative cartridge box according to the present invention.
Figure 7:
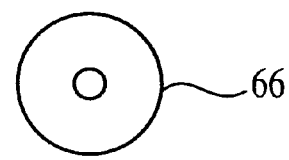
FIG. 7 illustrates a view of a sealed washer of the invention.

FIG. 5 shows an alternative embodiment in which no cartridge 22 is required. The device employs the hand-held gun 40 of FIGS. 3 and 4. A pressurized air hose 52 is connected to an air compressor (not shown). The air pressure in the air hose 52 is regulated using any standard air pressure valve 54. A two inch diameter pipe 58 defines the side walls of a compressed air chamber 60. The pipe 58 can be formed from any suitable material, such as aluminum, stainless steel, composite, and plastic. Aluminum is preferred. Furthermore, the diameter of the pipe 58 is not critical and can be any size as desired. To reduce manufacturing costs, a standard two inch diameter pipe 58 has been used by way of example. A plunger rod 64 is located within the pipe 58. The plunger rod 64 contains a sealed washer 66 which defines a movable lower wall of the compressed air chamber 60. FIG. 7 illustrates a view of the sealed washer 66. The sealed washer 66 provides an air seal with the inside walls of the pipe 58 and can slide along the inside walls of the pipe 58. A cap 59 defines an upper wall of the compressed air chamber 60. The cap 59 can be secured to the pipe 58 using any suitable securing device, such by screw threads, bolts, clamps and camlocks. An air inlet 56 is provided on the cap 59, or alternatively on any portion of the pipe 58 within the minimum size of the of compressed air chamber 60. For the device shown in FIG. 5, the minimum size of the compressed air chamber 60 is defined by the minimum distance between the cap 59 and the sealed washer 66. The air hose 52 is connected to the air inlet 56 to supply air pressure to the compressed air chamber 60. As the air pressure is increased in the compressed air chamber 60, air pressure forces the sealed washer 66 downward and away from the cap 59 which forces the plunger rod 64 downward.

Figure 6:
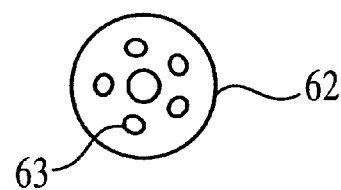
FIG. 6 illustrates a view of a guide washer of the invention having air passages.
Figure 8:
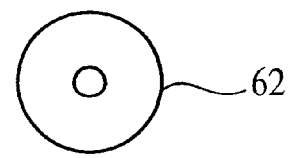
FIG. 8 illustrates a view of a sealed guide washer of the invention.

Optional guide washers 62 are located within the pipe 58 to maintain the location of the plunger rod 64 with respect to the side walls of the pipe 58. As shown in FIGS. 6 and 8, there are two types of guide washers 62. FIG. 6 illustrates a guide washer 62 having air passages 63. The plunger rod 64 glides through the center hole in the guide washer 62. FIG. 8 illustrates a sealed guide washer 62 having no air passages. Preferably, the guide washer shown in FIG. 5 closer to the container top 72 is a sealed guide washer 62 as shown in FIG. 8, and the guide washer 62 closer to the cap 59 is a guide washer 62 having air passages 63 as shown in FIG. 6. The compressed air chamber 60 is preferably provided with an air valve 68 for releasing the air pressure in the compressed air chamber 60 when desired. The pipe 58 should be provided with an air vent 70 which is located in a portion of the pipe 58 outside of the compressed air chamber 60, so that air pressure is not built up within the pipe 58 when the sealed washer 66 moves.

The pipe 58 is connected to a top cover 72 of a container 74 for containing the desired pastry dough, frosting or icing. The top cover 72 is removably mounted to the container 74 using cam locks 76. Any suitable securing device, such as bolts, screw threads, cam locks and clamps, can be used to secure the top cover 72 to the container 74. The plunger rod 64 extends down through the top cover 72 and into the container 74. A plunger 78 is mounted on the bottom of the plunger rod 64. The plunger 78 is constructed to provide a seal with the inside walls of the container 74 and slide along the inside walls of the container 74. The container 74 is provided with air valves 80 to remove air from the container 74 as desired. An outlet 82 is located at a bottom of the container 74. The outlet 82 is connected to a conduit 20, which is connected to the hand-held gun 40 in the same manner as described above.

The plunger rod 64 is preferably provided with a spring 84 which biases the plunger rod 64 in a direction away from the container 74. In this manner, when the air pressure is removed from the compressed air chamber 60 using the valve 68, the plunger 78 retracts from the bottom of the container 74 towards the top cover 72.

The operation of the device will now be described. First the air pressure in the compressed air chamber 60 is relieved by closing the valve 54 and opening the valve 68. When the pressure is relieved in the compresses air chamber 60, the container 74 can be separated from the container top 72. The container 74 can be filled with the desired pastry dough, icing or frosting and then attached to the container top 72. Air pressure can be applied to the compressed air chamber 60 by opening the valve 54 and closing the valve 68. Sufficient air pressure should be applied to the compressed air chamber 60 to force the plunger 78 down into contact with the pastry dough, icing or frosting in the container 74. Air caught between the plunger 78 and the top surface of the pastry dough, icing or frosting can be relieved through the valves 80. Preferably, most of the air caught between the plunger 78 and the top surface of the pastry dough, icing or frosting is removed prior to operation of the device. However, the device can be used with air present in the container 74.

Alternatively, a cartridge (not shown) containing the desired pastry dough, icing or frosting can be inserted into the open container 74. The cartridge can be similar to the cartridge 22, in that a cartridge plunger (not shown) is inserted into the cartridge after the desired pastry dough, icing or frosting is inserted. If the cartridge is used, a different plunger 78 will have to be attached to the bottom of the plunger rod 64 because the inside diameter of the cartridge will be less than the inside diameter of the container 74. The plunger 78 can be sized to contact a cartridge plunger in the cartridge or alternatively, the plunger 78 can be sized to seal with in the inside surface of the cartridge such that no cartridge plunger is required. When pressure is applied to the plunger 78 and the hand-held gun valve 43 is open, the plunger 78 forces pastry dough, icing or frosting out of the cartridge, through the outlet 82 and hose 20, into the hand-held gun 40, and out of the interchangeable head 46. The cartridges can be purchased containing the desired pastry dough, icing or frosting, or the desired pastry dough, icing or frosting can be formulated and loaded into the cartridges.

In general, the greater the air pressure against the plunger 78, the greater the speed at which the pastry dough, icing or frosting will travel out of the container 74 through the hose 20, and out of the hand-held gun 40 when the trigger 42 is pulled. Therefore, by varying the amount of air pressure against the plunger 78 using the valve 54, the speed of the pastry dough, icing or frosting being applied can be varied.

Multiple apparatus as shown in FIG. 5 can be used and connected to the hand-held gun 40 using multiple hoses 20. When multiple apparatus are used, the pressure can be shut off and on to each apparatus independently using the associated valve 54 to easily change between different types of pastry dough, icing or frosting being applied using the hand-held gun 40. The pressure can also be adjusted among the different apparatus to compensate for differences in viscosity. Higher viscosities usually require higher pressure to provide a desired level of speed through the hand-held gun 40. The device is suitable for high viscosity materials such as pastry dough, frosting and icing, which do not flow fast or can be sprayed like a liquid. Liquid materials, such as glazes and inks are unsuitable for use in the device described herein. Furthermore, such liquid materials require a spraying device which is very different from the device described herein.

Figure 9:
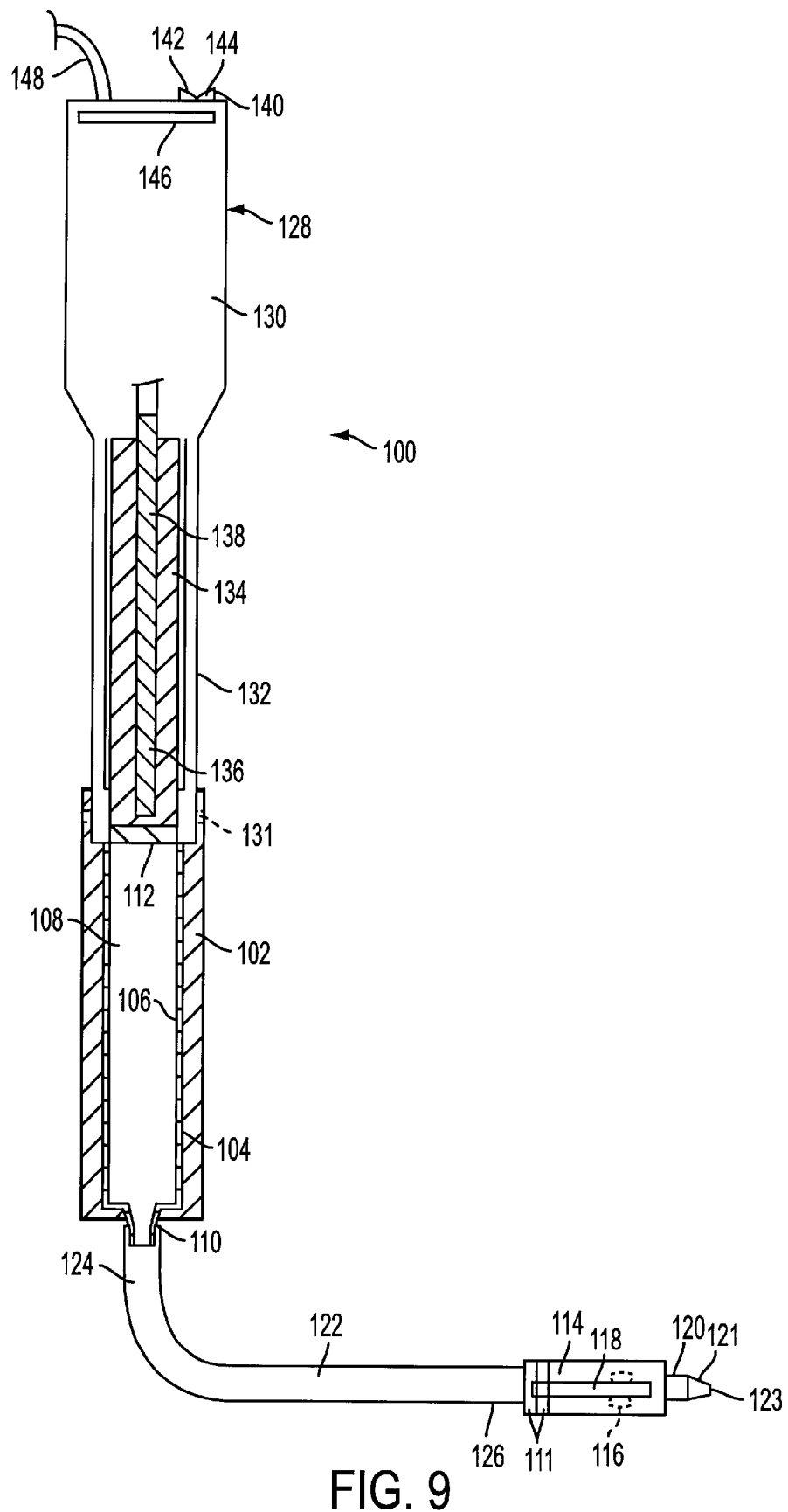
FIG. 9 illustrates another embodiment of a dispensing device of the invention which employs an electric motor.

With reference to FIG. 9, another embodiment of a device for dispensing the pastry dough, frosting or icing is shown generally indicated at 100. The device 100 includes a cartridge container 102 defining an internal chamber 104 constructed and arranged to contain a cartridge 106 therein. The cartridge 106 is pre-filled with pastry dough, frosting or icing 108 and has a cartridge outlet 110 at one end thereof and a plunger 112 at the other end of the cartridge 106. The cartridge 106 and plunger 112 are both generally cylindrical with the plunger 112 being mounted in the cartridge 106 for movement in a direction towards the container outlet 110.

A hand-held gun 114 of the type shown in FIG. 4 is provided which has a gun valve 116 and a trigger 118 which can be manually actuated to operate the gun valve 116. A nozzle 120 is connected to the gun 114. The nozzle 120 includes a removable head 121 having a shaped opening 123 permitting the pastry dough, frosting or icing 108 to be dispensed therefrom in a particular shape. Heads of other shapes can be attached to the gun 114. A flexible hose 122 is coupled at one end 124 to the cartridge outlet 110. The other end 126 of the hose 122 is coupled to the gun 114.

A reversible electric motor, generally indicated at 128, is removably coupled to the cartridge container to provide pressure on the plunger 112 to cause the pastry dough, frosting or icing 108 to be dispensed from the cartridge 106. In the illustrated embodiment, the motor 128 is coupled to the cartridge container 102 by a bayonet connection 131. Alternatively, clips, clamps, fasteners or other removable connections can be employed to couple the motor 128 to the cartridge container 102. The motor 128 includes a motor housing 130 which houses the electrical components of the motor. A piston housing 132 extends from the motor housing 130. The piston housing 132 houses a movable piston 134 of the motor 128. The piston 134 includes a threaded bore 136 which receives a threaded shaft 138 of the motor. When the shaft 138 is rotated by the motor, the shaft moves the piston 134 generally linearly in a forward and a reverse direction. In the illustrated embodiment, the shaft 138 includes right-handed threads such that when the motor rotates the shaft 138 counterclockwise, the piston 134 is moved forwardly (or downwardly in FIG. 9). The piston 134 is generally cylindrical. The piston 134 may have a diameter about equal to or less than the diameter of the plunger 112, the function of which will become apparent below.

The motor 128 includes a manual reversing switch 140 which causes the motor to operate in either the forward or reverse direction. Thus, when portion 142 of switch 140 is depressed the motor will operate in one direction and when portion 144 is depressed the motor will operate in the opposite direction. The motor 128 also includes a switch structure 146 which controls operation of the motor based on motor operating conditions. In the illustrated embodiment, the switch structure 146 is a conventional torque switch and may be of the type, for example, as disclosed in U.S. Pat. No. 4,987,358, the contents of which is hereby incorporated into the present specification by reference. Alternatively, the switch structure 146 may be a limit switch or a switch responsive to pressure in the cartridge 106. A power cord 148 is provided to supply AC power to the motor 128.

The device can be operated as follows. The cartridge container 102 is separated from the reversible electric motor 128 and a pre-filled cartridge 106 containing pastry dough, frosting or icing 108 is placed in the cartridge container 102. End 124 of hose 122 is coupled to the cartridge outlet 110. The electric motor 128 is then coupled to the cartridge container 102 via the bayonet connection 131. Switch 140 is actuated to operate the motor and thus move the piston 134 in the forward direction so that the end of the piston 134 engages the plunger 112 to exert pressure on the plunger 112 and force pastry dough, frosting or icing 108 to the gun 114. When a certain pressure is applied on the plunger 112 due to a certain motor torque, the switch structure 146 is activated which turns-off the motor 128 or at least stops forward movement of the piston 134. Trigger 118 is then actuated to dispense pastry dough, frosting or icing from the head 121 of the nozzle 120 of the gun 114. The electric motor 128 maintains pressure on the plunger 112 and thus on the pastry dough, frosting or icing 108 in the cartridge 106. This occurs due to determining torque of the motor 128 and by operating the switch structure 146 in response to the torque conditions. Thus, when the motor torque falls below the certain motor torque (due to pastry dough, frosting or icing being dispensed), the switch structure 146 permits re-actuation of the motor 128 to drive the piston 112 further forward to maintain pressure on the pastry dough, frosting or icing 108. Once the desired amount of pastry dough, frosting or icing 108 is dispensed from the cartridge 106, the switch 140 may be actuated to move the piston 112 in the reverse direction and out of the cartridge 106. Thereafter, the motor 128 can be removed from the cartridge container 102 via the bayonet connection 131.

Figure 10:
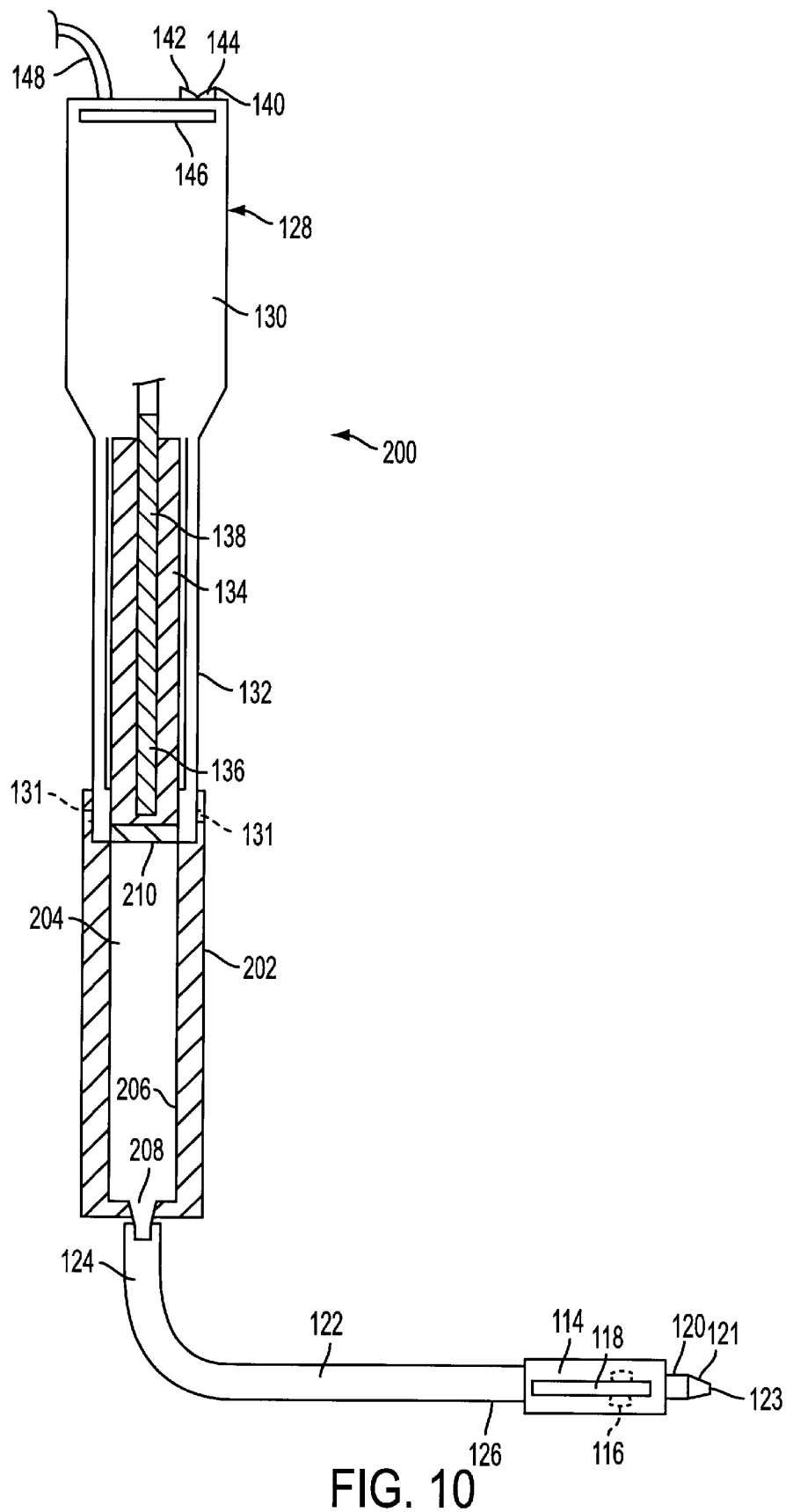
FIG. 10 illustrates a further embodiment of a dispensing device of the invention which employs an electric motor.

FIG. 10 shows generally at 200 an alternative embodiment in which no cartridge 106 is required. The device employs the electric motor 128 and the hand-held gun 114 of FIG. 9. The electric motor 128 is removably connected to an end of the frosting, icing or pastry dough cylinder 202 (hereinafter referred to as the "frosting cylinder 202") by a bayonet connection 131. Alternatively, clips, clamps, fasteners or other removable connections can be employed to couple the electric motor 128 to the frosting cylinder 202. The frosting cylinder 202 comprises an internal chamber 204, an inner surface 206 and an outlet 208. In place of the plunger 112 above, the piston 134 is connected to a plunger 210 which is constructed and arranged to slidably seal with the inner surface 206. If desired, the piston 134 and the plunger 210 can be integrally formed. The outlet 208 is connected to the hose 122. The hose 122 is connected to a hand-held gun 114 as described above.

The device can be operated as follows. The frosting cylinder 202 is separated from the reversible electric motor 128 and pastry dough, frosting or icing is placed into the frosting cylinder 202. End 124 of hose 122 is coupled to the outlet 208. The electric motor 128 is then coupled to the frosting cylinder 202 via the bayonet connection 131. Switch 140 is actuated to operate the motor and thus move the piston 134 in the forward direction so that the end of the piston 134 connected to the plunger 210 exerts pressure on and forces pastry dough, frosting or icing to the gun 114. When a certain pressure is applied on the plunger 210 due to a certain motor torque, the switch structure 146 is activated which turns-off the motor 128 or at least stops forward movement of the piston 134. Trigger 118 is then actuated to dispense pastry dough, frosting or icing from the head 121 of the nozzle 120 of the gun 114. The electric motor 128 maintains pressure on the plunger 210 and thus on the pastry dough, frosting or icing in the frosting cylinder 202. This occurs due to determining torque of the motor 128 and by operating the switch structure 146 in response to the torque conditions. Thus, when the motor torque falls below the certain motor torque (due to pastry dough, frosting or icing being dispensed), the switch structure 146 permits re-actuation of the motor 128 to drive the piston 134 and plunger 210 further forward to maintain pressure on the pastry dough, frosting or icing. Once the desired amount of pastry dough, frosting or icing is dispensed from the frosting cylinder 202, the switch 140 may be actuated to move the piston 134 and plunger 210 in the reverse direction and out of the frosting cylinder 202. Thereafter, the motor 128 can be removed from the frosting cylinder 202 via the bayonet connection 131.

The connections of the device are preferably swivel and/or bayonet throughout to simplify the use, assembly, disassembly, and the thorough cleaning required for the sanitary handling of food stuffs. More particulary, at least one conventional swivel connection 111 (FIG. 9) is associated with the gun 114 so as to permit the gun 114 to rotate easily with respect to the hose 122. In the illustrated embodiment, two swivel connections are provided so as to prevent tangling of the hose 122 when manipulating the gun 114. The swivel connection may be of the type disclosed in U.S. Pat. No. 4,343,498, the contents of which is hereby incorporated into the preset specification by reference.

The devices of the present invention are suitable for high viscosity materials such as pastry dough, frosting and icing, which do not flow fast or can be sprayed like a liquid. Low viscosity materials, such as many glazes and inks are unsuitable for use in the device described herein since they require a spraying device which is very different from the devices described herein.

While the claimed invention has been described in detail and with reference to specific embodiments thereof, it will be apparent to one of ordinary skill in the art that various changes and modifications can be made to the claimed invention without departing from the spirit and scope thereof.

What is claimed is:

1. A device for dispensing pastry dough, frosting or icing from a cartridge containing pastry dough, frosting or icing, the cartridge having a cartridge outlet and a plunger mounted for movement within the cartridge in a direction toward said cartridge outlet, the device comprising:

a cartridge container defining an internal chamber constructed and arranged to contain a cartridge therein, a hand-held gun having a gun valve and a finger trigger to actuate said gun valve, a nozzle connected to said gun, said nozzle having a head defining a shaped opening, a hose constructed and arranged to connect the cartridge outlet to said gun, a reversible electric motor removably coupled to an end of said cartridge container, said motor comprising:

a piston, a shaft coupled to said piston to move said piston generally linearly in both forward and reverse directions, and a switch structure to control operation of said motor, whereby, when a cartridge containing pastry dough, frosting or icing is disposed in said cartridge container and the cartridge outlet is connected with said hose and when said motor is actuated, said shaft moves said piston and said piston engages the plunger thereby forcing pastry dough, frosting or icing to the gun, and actuation of said finger trigger permits the pastry dough, frosting or icing to be dispensed from said nozzle.

2. A device according to claim 1, wherein said switch structure is a torque switch which controls operation of said motor based on motor torque.

3. A device according to claim 1, wherein said head is removable.

4. A device according claim 1, wherein said motor further includes a reversing switch for reversing movement of said piston.

5. A device according to claim 4, wherein said shaft is threadedly engaged with said piston and is constructed and arranged such that when said motor is actuated, said shaft rotates in one direction to move the piston in the forward direction to engage the plunger and when said reversing switch is actuated, said shaft rotates in a direction opposite said one direction to move the piston in the reverse direction.

6. A device according to claim 1, wherein said motor is removably coupled to said cartridge container by a bayonet connection.

7. A device according to claim 1, wherein said motor is an AC motor.

8. A device according to claim 5, wherein said piston is a generally solid cylindrical member which has a threaded bore for receiving threads of said shaft.

9. A device according to claim 1, wherein said switch structure is constructed and arranged to stop operation of said motor when torque conditions reach a certain condition and to permit restart of said motor when torque conditions fall below said certain condition.

10. A device according to claim 1, further comprising at least one swivel connection associated with said gun and said hose to permit said gun to rotate with respect to said hose.

11. A device according to claim 1, in combination with a cartridge containing pastry dough, frosting or icing, the cartridge having a container outlet and plunger structure mounted for movement in a direction toward said container outlet.

12. A combination according to claim 11, wherein said piston is a generally solid cylindrical member which has a threaded bore engaged with said shaft, said cartridge and said plunger being cylindrical, a diameter of said piston being less than a diameter of said plunger.

13. A method of dispensing pastry dough, frosting or icing from a cartridge containing pastry dough, frosting or icing, the cartridge having a cartridge outlet and a plunger mounted for movement in a direction toward said cartridge outlet, the method comprising:

inserting the cartridge into a cartridge container, coupling one end of a hose to a cartridge outlet, another end of said hose being connected with a hand-held gun having a gun valve, a finger trigger to actuate the gun valve, and a nozzle connected to the gun, the nozzle including a head defining a shaped opening, coupling a reversible electric motor in a removable manner to an end of said cartridge container, said motor comprising a piston and a shaft coupled to said piston to move said piston generally linearly in both forward and reverse directions, said motor including switch structure to control operation of said motor, actuating said motor to move the shaft and thus move the piston forwardly to engage the plunger thereby forcing the pastry dough, frosting or icing into the hose, and actuating said finger trigger to permit the pastry dough, frosting or icing to be dispensed from the shaped head.

14. A method according to claim 13, wherein said switch structure controls operation of said motor based on operating conditions on said motor such that when operating conditions reach a certain condition, said switch structure prevents movement of said piston and when the operating condition falls below said certain condition, said switch structure permits said piston to forwardly advance.

15. A method according to claim 13, further including:

reversing operation of said motor to cause said piston to move in a reverse direction, removing said motor from said cartridge container, and removing said cartridge from said cartridge container.

16. A method according to claim 13, wherein said piston is a generally solid cylindrical member which has a threaded bore engaged with threads of said shaft, said cartridge and said plunger being cylindrical, a diameter of said piston being less than a diameter of said plunger.

17. A method according to claim 13, wherein said switch structure is a torque switch which controls operation of said motor and thus movement of said piston based on motor torque conditions.

18. A device for dispensing pastry dough, frosting or icing from a cartridge containing pastry dough, frosting or icing, the cartridge having a cartridge outlet and a plunger mounted for movement within the cartridge in a direction toward said cartridge outlet, the device comprising:

a cartridge container defining an internal chamber constructed and arranged to contain a cartridge therein, a hand-held gun having a gun valve and a finger trigger to actuate said gun valve, a nozzle connected to said gun, said nozzle including a head defining a shaped opening, a hose constructed and arranged to connect the cartridge outlet to said gun, a reversible electric motor removably coupled to an end of said cartridge container, said motor comprising:

a piston, a shaft coupled to said piston to move said piston generally linearly in both forward and reverse directions, and a switch to cause said motor to operate in both forward and reverse directions, a torque switch to control operation of said motor, whereby, when a cartridge containing pastry dough, frosting or icing is disposed in said cartridge container and the cartridge outlet is connected with said hose and when said motor is actuated to operate in the forward direction, said shaft moves said piston and said piston engages the plunger thereby forcing pastry dough, frosting or icing to the gun, and actuation of said finger trigger permits the pastry dough, frosting or icing to be dispensed from said nozzle, said torque switch controlling operation of said motor based on torque conditions of said motor.

19. A device according to claim 18, wherein said torque switch is constructed and arranged to stop operation of said motor when torque conditions reach a certain condition and to permit restart of said motor when torque conditions fall below said certain condition.

20. A device according to claim 19, further comprising at least one swivel connection associated with said gun and said hose to permit said gun to rotate with respect to said hose.

21. A device for dispensing pastry dough, frosting or icing from a cylinder containing pastry dough, frosting or icing, the device comprising:
- a frosting cylinder defining an internal chamber constructed and arranged to contain pastry dough, frosting or icing, said frosting cylinder having on an end a frosting outlet,
- a hand-held gun having a gun valve and a finger trigger to actuate said gun valve,
- a nozzle connected to said gun, said nozzle having a head defining a shaped opening,
- a hose constructed and arranged to connect the outlet to said gun,
- a reversible electric motor removably coupled to an end of said frosting cylinder, said motor comprising:
  - a piston,
  - a shaft coupled to said piston to move said piston generally linearly in both forward and reverse directions,
  - a switch structure to control operation of said motor, and
  - a plunger coupled to said piston, said plunger being constructed and arranged to slidably seal against an inner surface of said frosting cylinder,
- whereby, when pastry dough, frosting or icing is disposed in said frosting cylinder and the outlet is connected with said hose and when said motor is actuated, said shaft moves said piston and said piston forces the plunger against the pastry dough, frosting or icing thereby forcing the pastry dough, frosting or icing to the gun, and actuation of said finger trigger permits the pastry dough, frosting or icing to be dispensed from said nozzle.

22. A device according to claim 21, wherein said switch structure is a torque switch which controls operation of said motor based on motor torque.

23. A device according to claim 21, wherein said head is removable.

24. A device according claim 21, wherein said motor further includes a reversing switch for reversing movement of said piston.

25. A device according to claim 24, wherein said shaft is threadedly engaged with said piston and is constructed and arranged such that when said motor is actuated, said shaft rotates in one direction to move the piston in the forward direction to engage the plunger against pastry dough, frosting or icing when disposed in the frosting cylinder and when said reversing switch is actuated, said shaft rotates in a direction opposite said one direction to move the piston in the reverse direction.

26. A device according to claim 21, wherein said motor is removably coupled to said frosting cylinder by a bayonet connection.

27. A device according to claim 21, wherein said motor is an AC motor.

28. A device according to claim 27, wherein said piston is a generally solid cylindrical member which has a threaded bore for receiving threads of said shaft.

29. A device according to claim 21, wherein said switch structure is constructed and arranged to stop operation of said motor when torque conditions reach a certain condition and to permit restart of said motor when torque conditions fall below said certain condition.

30. A device according to claim 21, further comprising at least one swivel connection associated with said gun and said hose to permit said gun to rotate with respect to said hose.

31. A method of dispensing pastry dough, frosting or icing from a device, the method comprising:
- inserting pastry dough, frosting or icing into a frosting cylinder having an outlet;
- coupling one end of a hose to the outlet, another end of said hose being connected with a hand-held gun having a gun valve, a finger trigger to actuate the gun valve, and a nozzle connected to the gun, the nozzle including a head defining a shaped opening;
- coupling a reversible electric motor in a removable manner to an end of said frosting cylinder, said motor comprising a piston and a shaft coupled to said piston to move said piston generally linearly in both forward and reverse directions, said motor including switch structure to control operation of said motor, said piston being coupled to a plunger which is constructed and arranged to slidably seal against an inner surface of said frosting cylinder;
- actuating said motor to move the shaft and thus move the piston forwardly to engage the plunger against pastry dough, frosting or icing disposed in the frosting cylinder thereby forcing the pastry dough, frosting or icing into the hose; and
- actuating said finger trigger to permit the pastry dough, frosting or icing to be dispensed from the shaped head.

32. A method according to claim 31, wherein said switch structure controls operation of said motor based on operating conditions on said motor such that when operating conditions reach a certain condition, said switch structure prevents movement of said piston and when the operating condition falls below said certain condition, said switch structure permits said piston to forwardly advance.

33. A method according to claim 31, further comprising reversing operation of said motor to cause said piston to move in a reverse direction, and removing said motor from said frosting cylinder.

34. A method according to claim 31, wherein said piston is a generally solid cylindrical member which has a threaded bore engaged with threads of said shaft, said cartridge and said plunger being cylindrical.

35. A method according to claim 31, wherein said switch structure is a torque switch which controls operation of said motor and thus movement of said piston based on motor torque conditions.

* * * * *